(12) United States Patent
Wang et al.

(10) Patent No.: US 12,339,654 B2
(45) Date of Patent: Jun. 24, 2025

(54) UNSUPERVISED FAULT DIAGNOSIS METHOD FOR MECHANICAL EQUIPMENT BASED ON ADVERSARIAL FLOW MODEL

(71) Applicant: SOOCHOW UNIVERSITY, Suzhou (CN)

(72) Inventors: Jun Wang, Suzhou (CN); Jun Dai, Suzhou (CN); Xingxing Jiang, Suzhou (CN); Weiguo Huang, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/916,720

(22) PCT Filed: Oct. 12, 2021

(86) PCT No.: PCT/CN2021/123194
§ 371 (c)(1),
(2) Date: Oct. 3, 2022

(87) PCT Pub. No.: WO2023/044978
PCT Pub. Date: Mar. 30, 2023

(65) Prior Publication Data
US 2024/0353829 A1    Oct. 24, 2024

(30) Foreign Application Priority Data

Sep. 27, 2021 (CN) .......................... 202111138262.0

(51) Int. Cl.
G05B 23/02 (2006.01)
(52) U.S. Cl.
CPC ....... *G05B 23/0281* (2013.01); *G05B 23/024* (2013.01)

(58) Field of Classification Search
None
See application file for complete search history.

(56) References Cited

U.S. PATENT DOCUMENTS

2020/0250304 A1    8/2020   Kruus et al.
2020/0334978 A1*  10/2020   Pittman ................ G08G 1/0112

FOREIGN PATENT DOCUMENTS

| CN | 109186973 A | 1/2019 |
|---|---|---|
| CN | 112183581 A | 1/2021 |

(Continued)

*Primary Examiner* — Walter L Lindsay, Jr.
*Assistant Examiner* — Geoffrey T Evans
(74) *Attorney, Agent, or Firm* — SZDC Law PC

(57) ABSTRACT

The present invention provides an unsupervised fault diagnosis method for mechanical equipment based on an adversarial flow model, main steps including: data preprocessing, converting a mechanical vibration signal into a frequency domain signal, and normalizing the amplitude value of the signal into a range of [0, 1]; prior distribution designing: designing a mixture of Gaussian distribution with K subdistributions, wherein K is determined by the number of mechanical equipment status; model construction: constructing an unsupervised fault diagnosis model by combining an autoencoder, a flow model, and a classifier; model training: training the unsupervised fault diagnosis model by using various classes of status data, along with the designed prior distribution, preset training steps, loss functions, and an optimization algorithm; and fault diagnosis: inputting status data of mechanical equipment into the trained unsupervised fault diagnosis model to obtain a data clustering result and a fault diagnosis result.

9 Claims, 5 Drawing Sheets

(56) References Cited

FOREIGN PATENT DOCUMENTS

| | | |
|---|---|---|
| CN | 112232252 A | 1/2021 |
| CN | 113239610 A | 8/2021 |

\* cited by examiner

UNSUPERVISED FAULT DIAGNOSIS METHOD FOR MECHANICAL EQUIPMENT BASED ON ADVERSARIAL FLOW MODEL

This application is the National Stage Application of PCT/CN2021/123194, filed on Oct. 12, 2021, which claims priority to Chinese Patent Application No. 202111138262.0, filed on Sep. 27, 2021, which is incorporated by reference for all purposes as if fully set forth herein.

FIELD OF THE INVENTION

The present invention relates to the field of equipment diagnosis, and specifically, to an unsupervised fault diagnosis method for mechanical equipment based on an adversarial flow model.

DESCRIPTION OF THE RELATED ART

Rotating mechanical equipment is developing in the direction of large scale, precision, and automation, which puts forward more stringent requirements on the manufacturing, installation, and daily maintenance of components in the entire system. A minor damage to any component may affect the normal operation of the entire system or even cause accidents. To ensure the normal operation of mechanical equipment, health monitoring system is used to acquire massive data to monitor the health condition, which promoting the mechanical health monitoring enter the "big data" era. In the era of big data and driven by industrial big data analysis technology, intelligent fault diagnosis technology is applied to monitor health information. The health information can serve for intelligent maintenance and ensure the safety of machinery. Intelligent fault diagnosis has been an important research direction for the modern manufacturing industry. With the rapid development of artificial intelligence, machine learning technology is used to empower intelligent fault diagnosis technologies, enabling the computers to analyze data, summarize experience, and provide important technical support for intelligent diagnosis of machinery in the era of big data. At present, several models have been widely used in intelligent fault diagnosis, such as convolutional neural networks (CNN), deep belief networks (DBN), recurrent neural networks (RNN). These models are trained by massive historical data and corresponding class labels to realize classification of fault types or fault sizes. These models are all supervised learning models, which means these models are trained to create a connection between inputted data and corresponding labels. However, in practical diagnosis process, it takes a lot of time to manually assign class labels to whole dataset, the accuracy of the labels is heavily dependent on the experience of the experts. Therefore, the fully labeled dataset in industrial big data is rare. The problem of missing labels requires intelligent fault diagnosis models can learn and cluster data features without corresponding class labels and realize unsupervised fault diagnosis.

Commonly used unsupervised fault diagnosis methods are based on clustering algorithms, such as k-means, Gaussian mixed model (GMM) and expectation maximization (EM). These clustering algorithms divide the mechanical status dataset into different classes or clusters according to the specific standard, such as distance criterion. These methods aim to maximize the similarity of status data in the same cluster and maximize the difference of status data in different clusters. Through these methods the data with the same health status will be gathered, while the data with different health status will be separated. When preforming unsupervised fault diagnosis through these clustering algorithms, the features with category information should be extracted from mechanical vibration signals at first. Then the parameters of these clustering algorithms are trained by the extracted features. Common feature extraction methods include statistical methods, dimensional reduction methods, and combination methods.

The limitation of traditional clustering algorithms:

The effectiveness of clustering algorithms in unsupervised fault diagnosis depends on the extraction effect of features and the adaptability of the clustering algorithms to the distribution of extracted features. The common feature extraction methods are unable to extract high confidence features from mechanical data. And common clustering algorithms are only suitable for datasets with specific distribution characteristics. For example, K-means is only applicable to the clustering of data with regular spherical distribution features. And the GMM and EM algorithm are only applicable to clustering datasets where the data distribution features of each category follow the Gaussian distribution. Therefore, the existing unsupervised fault diagnosis methods have insufficient feature extraction capability and inadequate adaptability to different datasets. As a result, the unsupervised fault diagnosis methods are unable to obtain high fault diagnosis accuracy.

SUMMARY OF THE INVENTION

A technical problem to be resolved by the present invention is to provide an unsupervised fault diagnosis method for mechanical equipment based on an adversarial flow model. Focus on the problems that the existing unsupervised fault diagnosis methods have insufficient feature extraction capability and inadequate adaptability to different datasets. In the present invention, based on deep neural networks, low-dimensional features of data are extracted by using an autoencoder, and are mapped into a prior distribution by using a flow model and adversarial training scheme. The invention improves the feature extraction capability of mechanical status data and breaks the limitation of distribution characteristics varying. Accuracy diagnosis result can be achieved by this invention.

To resolve the technical problems above, the present invention provides an unsupervised fault diagnosis method for mechanical equipment based on an adversarial flow model, including:

step (1), data preprocessing: converting a mechanical vibration signal into a frequency domain, and normalizing the amplitude value of the frequency domain signal into a range of [0, 1];

step (2), prior distribution designing: designing a mixture of Gaussian distribution with K subdistributions, wherein K is determined by the number of mechanical equipment status;

step (3), model construction: constructing an unsupervised fault diagnosis model by combining an autoencoder, a flow model, and a classifier;

step (4), model training: training the unsupervised fault diagnosis model by using various classes of status data along with the designed prior distribution, preset training steps, loss functions, and an optimization algorithm; and step (5), fault diagnosis: inputting status data of mechanical equipment into the trained unsupervised fault diagnosis model to obtain a data clustering result and a fault diagnosis result.

In an embodiment, in step (1), the vibration signals of each category of the mechanical equipment state have a few class labels, and the class labels are not participating in model training and are only used for determining health states corresponding to the various classes; and data amounts of the various classes are the same or equivalent.

In an embodiment, in step (2), dimensionality of the mixture of Gaussian distribution is greater than or equal to 1, the K subdistributions in the mixture of Gaussian distribution have different average values and small variances or covariance, and the subdistributions almost have no overlap; and a batch of vectors are randomly sampled from the designed prior distribution as prior features, and pseudo labels of the prior features are 0, 1, 2, . . . , and K−1, respectively.

In an embodiment, in step (3), the autoencoder is constructed by an encoder and a decoder, low-dimensional features of inputted data are learned by using the encoder, dimensionality of the low-dimensional features is the same as the dimensionality of the designed mixture of Gaussian distribution, and the inputted data is reconstructed by inputting the low-dimensional features into the decoder; the flow model maps the low-dimensional features of the inputted data into a Gaussian distribution with the same dimensionality as the low-dimensional features, and obtains mapped features; a combination of the autoencoder and the flow model is called a feature extractor; and the classifier classifies the mapped features and prior features separately.

In an embodiment, in step (3), the autoencoder can be built by a fully-connected network, a deep convolutional network, a deep belief network (DBN), or a deep residual network; the flow model comprises one of a nonlinear independent component estimation (NICE) model, a real-valued non-volume preserving (RealNVP) model, and a generative flow with invertible 1×1 convolutions (GLOW) model; and the classifier comprises one of a support vector machine, a K-nearest neighbor algorithm, a random forest, a fuzzy system, and a deep neural network.

In an embodiment, in step (4), the model training method is adversarial training, and the preset training steps comprise: training the feature extractor by using unlabeled mechanical status data firstly, wherein in this case, parameters of the classifier are fixed, and the loss function comprises a data reconstruction loss for the autoencoder, a distribution mapping loss for the flow model, a Shannon entropy loss and a class average distribution loss of class labels for the classifier; then training the classifier by using unlabeled mapped features and prior features with pseudo labels, wherein in this case, parameters of the feature extractor are fixed, and the loss function comprises a cross-entropy classification loss for the prior features, a Shannon entropy loss and a class average distribution loss of class labels for the prior features and the mapped features; alternately training the feature extractor and the classifier until the classifier can give each mapped feature a high confidence pseudo label, wherein in this case, the mapped features obey the subdistributions with corresponding pseudo labels in the prior distribution, and the preset optimization algorithm comprises one of an adaptive moment estimation (Adam), a stochastic gradient descent (SGD), and a root mean square prop (RMSPorp) algorithm.

In an embodiment, in step (5), actual health state of data with pseudo label is determined according to a correspondence relationship which is established by a few vibration signals with status class labels and pseudo labels of the vibration signals predicted by the model, thereby implementing the fault diagnosis of the mechanical equipment.

Based on the same inventive concept, the present application further provides a computer device, including a memory, a processor, and a computer program stored in the memory and configured to be executed by the processor, where the processor is configured to execute the program to implement the steps in the method.

Based on the same inventive concept, the present application further provides a computer-readable storage medium, on which a computer program is stored, where a processor is configured to execute the program to implement the steps in the method.

Based on the same inventive concept, the present application further provides a processor, configured to execute a program, where the program is executed to implement the method.

The beneficial effects of the invention are as follows:

Compared with the existing unsupervised algorithms, the present invention provides an unsupervised fault diagnosis method for mechanical equipment based on an adversarial flow model. This method uses deep neural networks to extract the latent features from mechanical state data. The feature extraction capability is more effective than existing unsupervised algorithms. Then the extracted features can be further mapped into the prior distribution by the normalizing flow model and adversarial training mechanism. The mapping process breaks the limitations of the distribution change. Therefore, the method in the present invention has the following advantages: (1) high extraction ability of state features of mechanical vibration signals; (2) high clustering ability of mechanical state data; and (3) high accuracy of mechanical fault diagnosis.

DETAILED DESCRIPTION OF THE PREFERRED EMBODIMENTS

Figure 1:
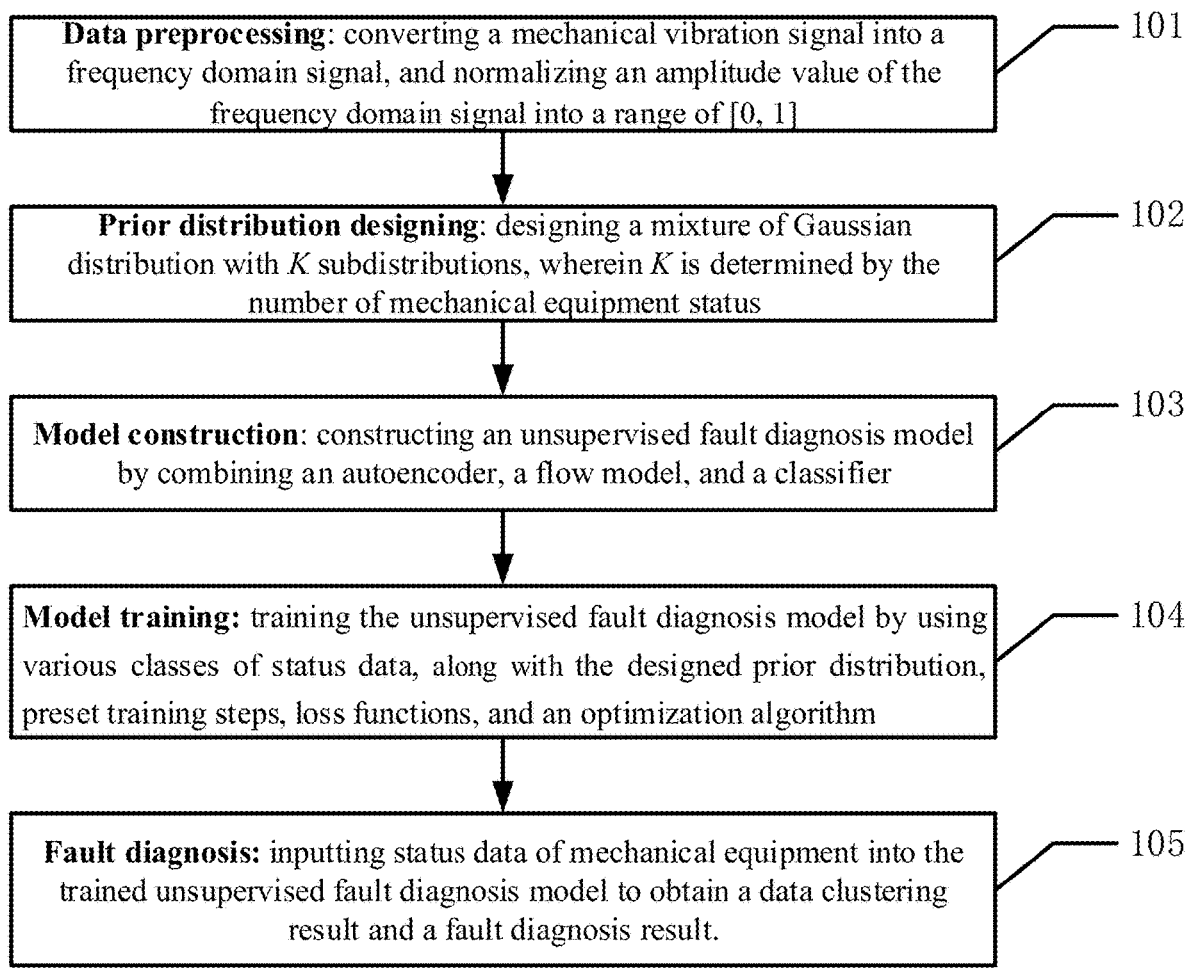
FIG. 1 is the schematic diagram of the present unsupervised fault diagnosis method for mechanical equipment based on adversarial flow model.

The present invention is further described below through drawings and a specific embodiment. The embodiment is intended to enable a person skilled in the art to better understand and implement the present invention. The embodiments do not limit the invention.

According to SUMMARY and FIGURES, the unsupervised fault diagnosis method for mechanical equipment based on an adversarial flow model includes the following steps.

Step 101: Data preprocessing: Convert a mechanical vibration signal into a frequency domain, and normalizing an amplitude value of the frequency domain signal into a range of [0, 1].

Step 102: Prior distribution designing: Design a mixture of Gaussian distribution with K subdistributions, wherein K is determined by the number of mechanical equipment status.

The dimensionality of the mixture of Gaussian distribution is greater than or equal to 1, the K subdistributions in the mixture of Gaussian distribution have different average values and small variances or covariance, and the subdistributions almost have no overlap. A batch of vectors are randomly sampled from the designed prior distribution as prior features, and pseudo labels of the prior features are respectively 0, 1, 2, . . . , and K−1.

Step 103: Model construction: Construct an unsupervised fault diagnosis model by combining an autoencoder, a flow model, and a classifier.

The autoencoder is constructed by an encoder and a decoder, low-dimensional features of inputted data are learned by using the encoder, the dimensionality of the low-dimensional features is the same as the dimensionality of the designed mixture of Gaussian, and the inputted data is reconstructed by inputting the low-dimensional features into the decoder. The flow model maps the low-dimensional features of the inputted data into a Gaussian distribution with the same dimensionality as the low-dimensional features, and obtains mapped features. A combination of the autoencoder and the flow model is referred to as a feature extractor. The classifier classifies the mapped features and prior features separately.

The autoencoder is built by using, but not limited to, one of a fully-connected network, a convolutional neural network, a DBN, and a deep residual network.

The flow model includes one of a NICE model, a Real-NVP model, and a GLOW model.

The classifier includes, but not limited to, one of a support vector machine, a K-nearest neighbor algorithm, a random forest, a fuzzy system, and a deep neural network.

Step 104: Model training: Train the unsupervised fault diagnosis model by using various classes of status data according to the designed prior distribution and preset training steps, loss functions, and an optimization algorithm.

The present model is trained through an adversarial training process, and the preset training steps comprise: training the feature extractor by using unlabeled mechanical status data firstly, where in this case, parameters of the classifier are fixed, and the loss function includes a data reconstruction loss for the autoencoder, a distribution mapping loss for the flow model, and a Shannon entropy loss and a class average distribution loss of class labels for the classifier; then training the classifier by using (unlabeled) mapped features mapped features and prior features (with pseudo labels), where in this case, parameters of the feature extractor are fixed, and the loss function contain a cross-entropy classification loss of the prior features, a Shannon entropy loss and a class average distribution loss of class labels for the prior features and the mapped features; alternately training the feature extractor and the classifier until the classifier can give each mapped feature a high confidence pseudo label with high certainty, where in this case, the mapped features obey the subdistributions with corresponding pseudo labels in the a prior distribution.

The functions of the loss functions are as follows:
1) Data reconstruction loss of the autoencoder. The mean square error of reconstructed data and inputted data are calculated. Optimizing this loss function ensures the ability of the autoencoder to efficiently extract features from the input data.
2) Distribution mapping loss of the flow model. The difference between mapped features and original low-dimensional feature is calculated. Optimizing this loss function ensures the ability of the flow model efficiently map the latent feature to the designed prior distribution.
3) Data classification loss of the classifier. (1) Cross entropies loss between predicted labels of prior features outputted by the classifier and pseudo labels of the prior features are calculated to establish a correspondence relationship between the prior distribution and the pseudo labels. (2) The Shannon entropy loss of predicted label outputted by the classifier for prior features and aligned latent features. The Shannon entropy loss aims to give certain classification assignment to prior features and give vague classification assignment to aligned latent features. To realize the adversarial training, the autoencoder is optimized by optimization algorithm to extract more effective fault characteristic information and obtain high confidence classification from the classifier.
4) Class average distribution loss of the classifier. The distribution of the predicted labels of the prior features outputted by the classifier and the predicted labels of the mapped features in various classes is calculated, and the classifier is optimized by an optimization algorithm to enable the classifier to equally assign classification labels. In addition, the autoencoder is optimized to enable the autoencoder to extract class information from signals.

The preset optimization algorithm includes, but not limited to, one of an Adam estimation algorithm, an SGD method, and an RMSPorp algorithm.

Step 105: Fault diagnosis: Input status data of mechanical equipment into the trained fault diagnosis model to obtain a data clustering result and a fault diagnosis result.

Actual health state of data with pseudo labels is determined according to a correspondence relationship. The relationship is established by a few vibration signals with status class labels and predicted pseudo labels of these vibration signals. Through this correspondence the fault diagnosis of the mechanical equipment is realized.

For clearer understanding of the technical solutions of the present invention and effects, a detailed description is provided below with a specific embodiment.

The present invention is performed on the bearing fault diagnosis. The test bearing (Type: 6205-2RS) is driven by an AC motor and rotating speed is kept at 896 RPM. An acceleration sensor is mounted on the bearing pedestal to acquire vibration signal from the bearing. The sampling frequency is 10 kHz. The dataset contains four states, including normal state (N), inner race fault (IR), outer race fault (OR), and ball element fault (B). According to the fault severity (width of the fault slit), each fault state is divided into three sub-states, corresponding to the width of 0.2 mm, 0.3 mm, and 0.4 mm, respectively. For convenience, one fault state is denoted by the fault location combining the slit width. For example, IR02 represents the fault state with a 0.2 mm width of slit located in the bearing inner-race way. Hence, the dataset contains 10 different health states. The dataset is divided into a training dataset and a testing dataset in the experiment. In the training dataset each fault state contains 400 samples. In the testing dataset each fault state contains 100 samples. Each sample has 2048 points in the time domain. The training dataset is used for model training, and the testing dataset is used for model testing.

Figure 2:
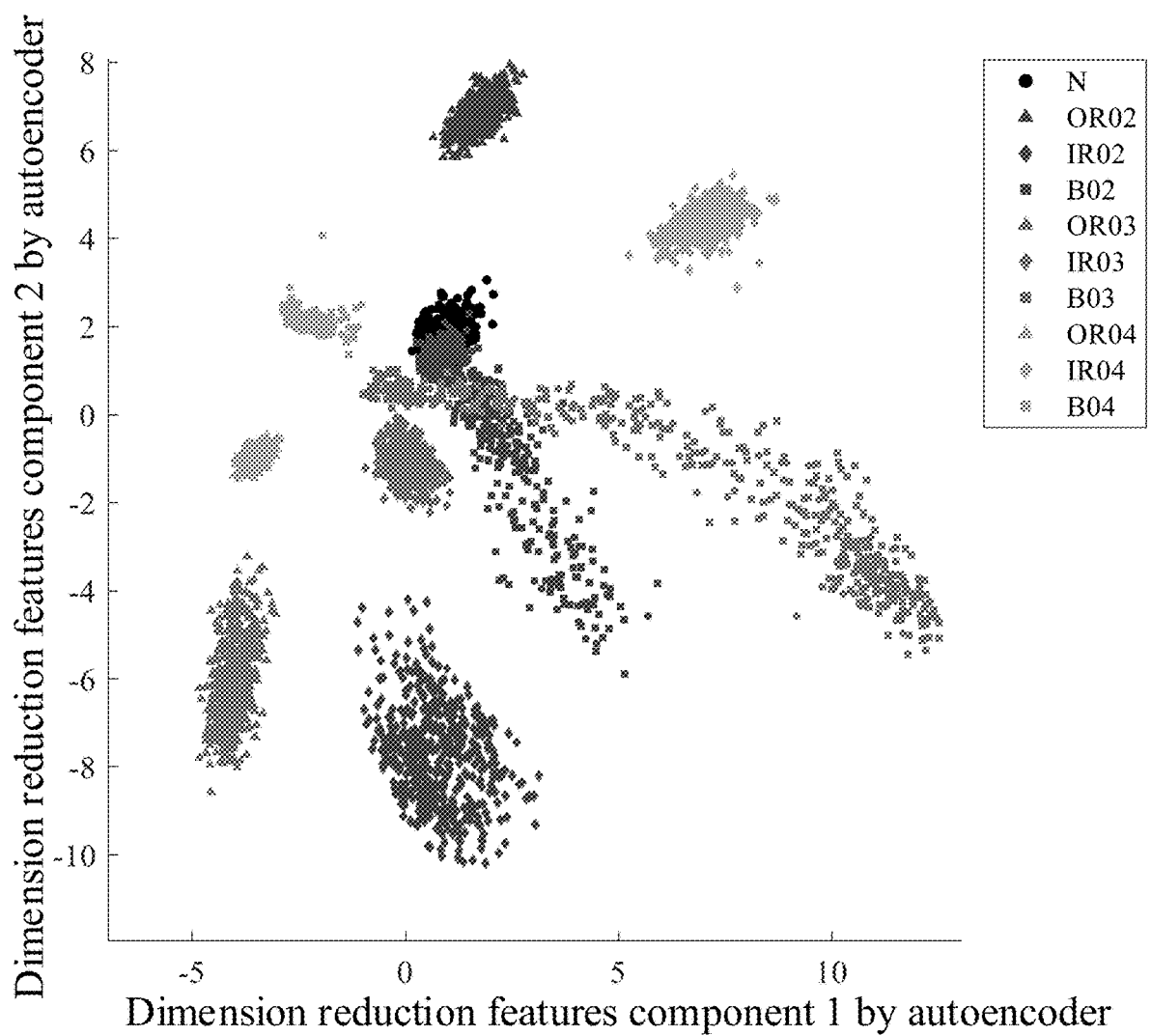
FIG. 2 is the low-dimensional features extracted by autoencoder in the specific embodiment of the present unsupervised fault diagnosis method for mechanical equipment based on adversarial flow model.

In the experiment, the feature learning effect of single autoencoder is first tested. The autoencoder is trained by the training dataset. The dimensionality of latent features is set to 2. In the testing phase, the latent feature distribution of testing set is displayed in FIG. 2. Some bearing health states cannot be discriminated from another by the latent vectors of the AE, especially the states of N, B02, and B03. The result indicates that the single autoencoder cannot extract effective latent features for bearing unsupervised fault diagnosis.

Then, the present invention is applied to analyze the same dataset. Specific details are as follows.

Step (1): Data preprocessing: Convert a mechanical vibration signal into a frequency domain, and normalize an amplitude value of the frequency domain signal into a range of [0, 1].

Each sample has 2048 points. After Fourier transform the spectrum has 2048 points. The first 1024 points are taken as the inputted data of the model. The amplitude value is normalized into the range of [0, 1].

Step (2): Prior distribution designing: Design a mixture of Gaussian distribution with K subdistributions, wherein K is determined by the number of mechanical equipment status.

Figure 3:
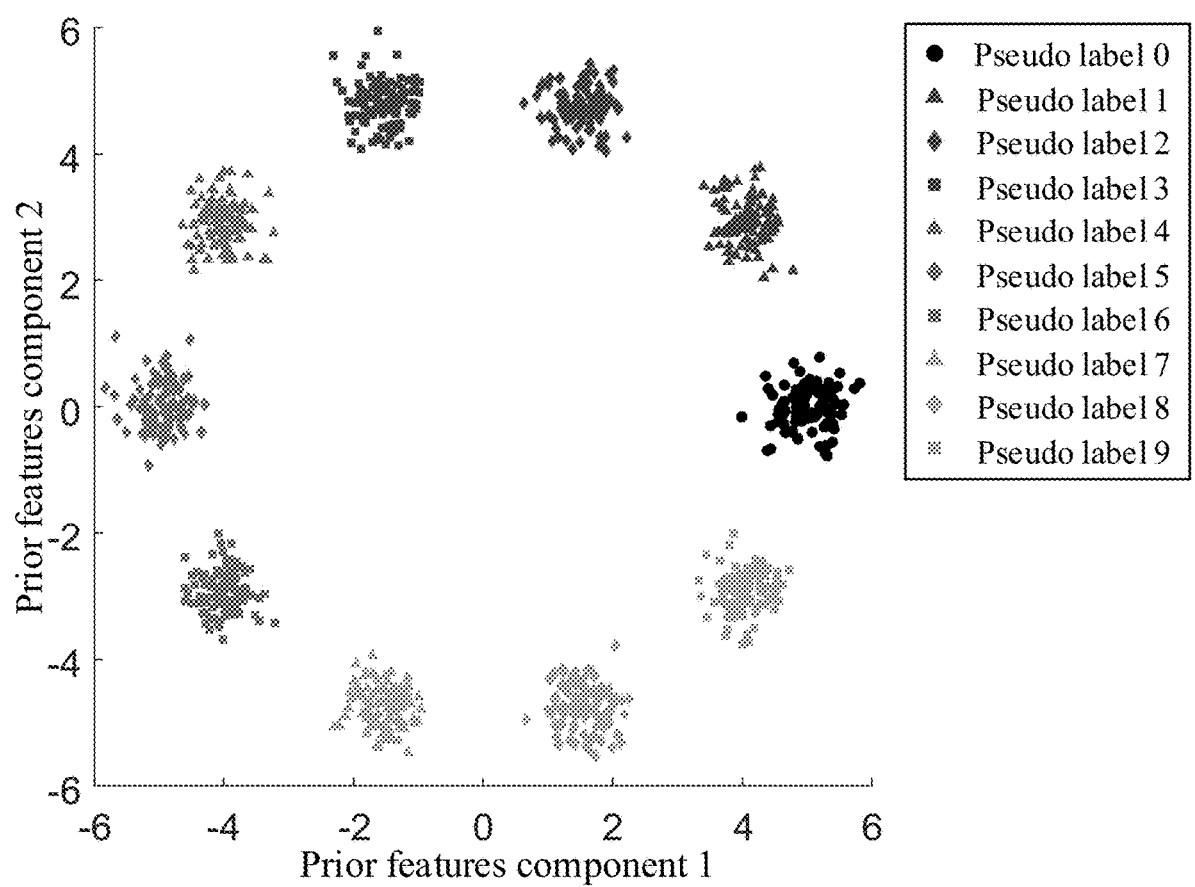
FIG. 3 is the designed prior distribution in the specific embodiment of the present unsupervised fault diagnosis method for mechanical equipment based on adversarial flow model.

A mixture of Gaussian distribution with 10 sub-Gaussian distributions is designed in this example, where 10 is the number of classes. The dimensionality of the prior distribution is 2. The mean value matrix of initial subdistribution is [5, 0] and the covariance matrix is [[0.05, 0]; [0, 0.05]]. The other nine subdistributions are obtained by rotating an angle N*π/5 (N=1, 2, 3, ..., 9) around the origin. A batch of a prior features are randomly sampled from the designed priori distribution, the distribution of the prior features with pseudo labels are shown in FIG. 3. It can be seen that the 10 sub-distributions are distributed uniformly in latent space with no overlap between the each other. The prior features are the ideal clustering features.

Step (3): Model construction: Construct an unsupervised fault diagnosis model by combining an autoencoder, a flow model, and a classifier.
  (1) The autoencoder includes an encoder and a decoder. The encoder contains three layers. The dimensionality of each hidden layer is 512, 128, and 2, respectively. Tanh activation function layer is used to connect fully connected layers. The last fully connected layer outputs a 2-dimensional latent feature. The latent feature is subsequently inputted into the decoder. The decoder also contains three layers. The dimensionality of each hidden layer is 128, 512, and 1024, respectively. Tanh activation function layer is used to connect fully connected layers.
  (2) The flow model is constructed by RealNVP structure. Four coupling layers are stacked in the structure. Fully connected layer is used in each coupling layer. The dimensionality of the fully connected layer is 8. ReLU activation function layer is used to connect each layer.
  (3) The classifier is constructed by fully connected layer. The classifier contains three layers. The dimensionality of each hidden layer is 100, 100, and 10, respectively. The output of each hidden layer is activated by ReLU, ReLU and Softmax, respectively. The classifier eventually outputs a 10-dimensional vector.

Step (4): Model training: Train the unsupervised fault diagnosis model by using various classes of status data according to a designed prior distribution, preset training steps, loss functions, and an optimization algorithm.

First, the feature extractor is trained. The step includes four parts of target functions: (1) mean square error loss between inputted data and outputted data of the autoencoder; (2) Shannon entropies of mapped features labels predicted by the classifier; (3) average distribution entropy of predicted labels for various classes of mapped features; and (4) difference between a probability density of mapped features and a probability density of prior features.

Subsequently, the feature extractor is fixed, and the mapped features and the prior features are simultaneously inputted into the classifier to obtain corresponding classification labels. The step includes three target functions: (1) Shannon entropies of the prior features labels and the mapped features labels predicted by the classifier; (2) cross entropy between predicted labels of the prior features and pseudo labels of the prior features; and (3) average distribution entropy of the predicted labels for various classes of prior features.

An Adam estimation is used in the optimization algorithm. The learning rate is 0.0005. After 500 times of iteration, losses of the feature extractor and the classifier tend to be balanced, and the model training is ended.

Step 5: Fault diagnosis: Input status data of mechanical equipment into the trained fault diagnosis model to obtain a data clustering result and a fault diagnosis result.

Figure 4:
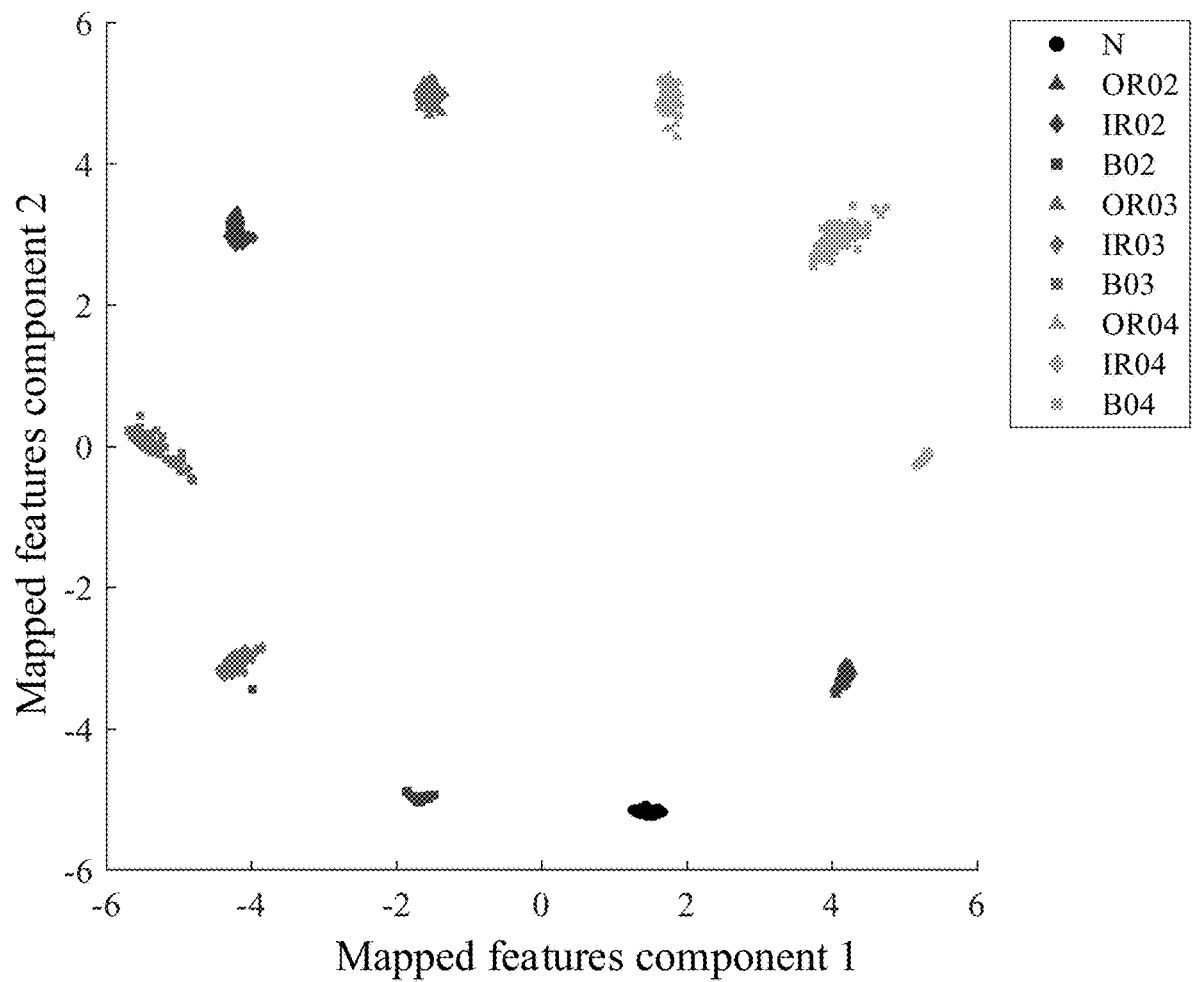
FIG. 4 is the feature extraction result obtained by present invention in the specific embodiment of the present unsupervised fault diagnosis method for mechanical equipment based on adversarial flow model.
Figure 5:
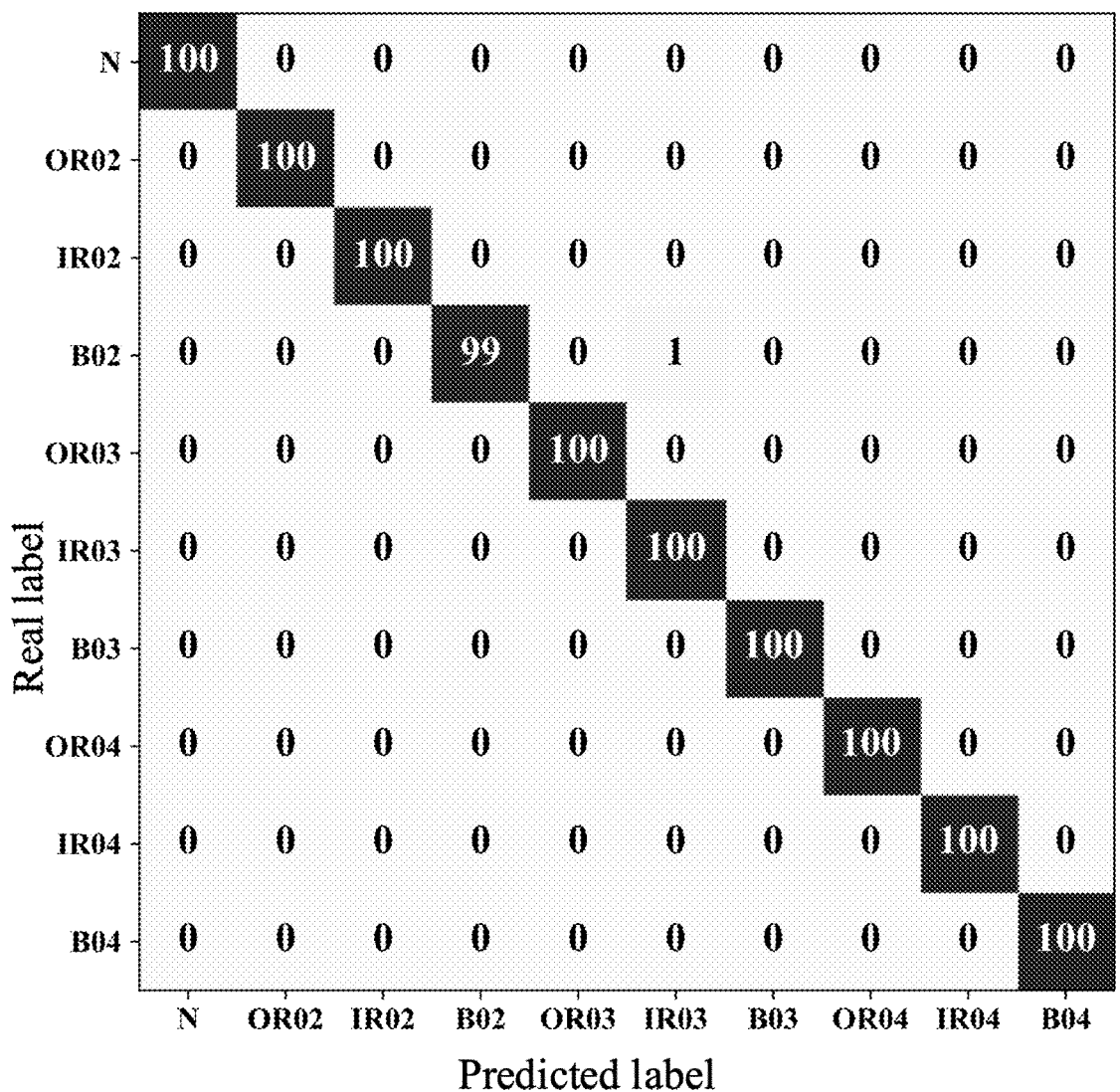
FIG. 5 is the classification result obtained by present invention in the specific embodiment of the present unsupervised fault diagnosis method for mechanical equipment based on adversarial flow model.

The testing dataset is inputted into the trained model. The distribution of aligned features of data in 2D latent space is shown in FIG. 4. As can be seen from the FIG. 4, the aligned latent features belonging to the same bearing health state are assembled at the same area in the space, which strictly follows a specific prior distribution. The distribution of aligned latent features indicate that the present invention can extract effective features and map the latent feature into the prior distribution. After aligned, the aligned features are inputted into the classifier to obtain clustering labels. By using a few labeled sample, the correspondence between clustering result and real health status will be established. The diagnosis result is represented by a confusion matrix, as shown in FIG. 5. As can be seen, the present invention obtains high unsupervised fault diagnosis accuracy. Only one sample B02 is misclassified as IR03. The cause of the error is that the aligned feature of the sample B02 is incorrectly aligned to the subdistribution of IR03.

In summary, the present invention uses autoencoder to extract latent features, and uses flow model and adversarial training scheme to align the features with prior distribution. The present invention can improve the feature extract ability and break the limitation of the distribution characteristics. Therefore, the present invention can realize high accurate unsupervised fault diagnosis.

The above described embodiments are only preferred embodiments to fully illustrate the invention, and the scope of protection of the invention is not limited to this example. Equivalent replacements or variations made by a person skilled in the art are within the protection of the present invention. The protection scope of the present invention is defined in the claims.

What is claimed is:

1. An unsupervised fault diagnosis method for mechanical equipment based on an adversarial flow model, comprising steps of:
  (1) data preprocessing: converting a mechanical vibration signal into a frequency domain signal, and normalizing an amplitude value of the frequency domain signal into a range of [0, 1];

(2) prior distribution designing: designing a mixture of Gaussian distribution with K subdistributions, wherein K is determined by the number of mechanical equipment status;

(3) model construction: constructing an unsupervised fault diagnosis model by combining an autoencoder, a flow model, and a classifier;

(4) model training: training the unsupervised fault diagnosis model by using various classes of status data, along with the designed prior distribution, preset training steps, loss functions, and an optimization algorithm; and (5) fault diagnosis: inputting status data of mechanical equipment into the trained unsupervised fault diagnosis model to obtain a data clustering result and a fault diagnosis result, wherein in step (3), the autoencoder is constructed by an encoder and a decoder, low-dimensional features of inputted data are learned by using the encoder, dimensionality of the low-dimensional features is the same as the dimensionality of the designed mixture of Gaussian distribution, and the inputted data is reconstructed by inputting the low-dimensional features into the decoder; the flow model maps the low-dimensional features of the inputted data into a Gaussian distribution with the same dimensionality as the low-dimensional features, and obtains mapped features; a combination of the autoencoder and the flow model is called a feature extractor; and the classifier classifies the mapped features and prior features separately.

2. The unsupervised fault diagnosis method for mechanical equipment based on an adversarial flow model according to claim 1, wherein in step (1), the vibration signals of each category of the mechanical equipment state have a few class labels, and the class labels are not participating in model training and are only used for determining health states corresponding to the various classes; and data amounts of the various classes are the same or equivalent.

3. The unsupervised fault diagnosis method for mechanical equipment based on an adversarial flow model according to claim 1, wherein in step (2), dimensionality of the mixture of Gaussian distribution is greater than or equal to 1, the K subdistributions in the mixture of Gaussian distribution have different average values and small variances or covariance, and the subdistributions almost have no overlap; and a batch of vectors are randomly sampled from the designed prior distribution as prior features, and pseudo labels of the prior features are 0, 1, 2, . . . , and K−1, respectively.

4. The unsupervised fault diagnosis method for mechanical equipment based on an adversarial flow model according to claim 1, wherein in step (3), the autoencoder can be built by a fully-connected network, a deep convolutional network, a deep belief network (DBN), or a deep residual network; the flow model comprises one of a nonlinear independent component estimation (NICE) model, a real-valued non-volume preserving (RealNVP) model, and a generative flow with invertible 1×1 convolutions (GLOW) model; and the classifier comprises one of a support vector machine, a K-nearest neighbor algorithm, a random forest, a fuzzy system, and a deep neural network.

5. The unsupervised fault diagnosis method for mechanical equipment based on an adversarial flow model according to claim 1, wherein in step (4), the model training method is adversarial training, and the preset training steps comprise: training the feature extractor by using unlabeled mechanical status data firstly, wherein in this case, parameters of the classifier are fixed, and the loss function comprises a data reconstruction loss for the autoencoder, a distribution mapping loss for the flow model, a Shannon entropy loss and a class average distribution loss of class labels for the classifier; then training the classifier by using unlabeled mapped features and prior features with pseudo labels, wherein in this case, parameters of the feature extractor are fixed, and the loss function comprises a cross-entropy classification loss for the prior features, a Shannon entropy loss and a class average distribution loss of class labels for the prior features and the mapped features; alternately training the feature extractor and the classifier until the classifier can give each mapped feature a high confidence pseudo label, wherein in this case, the mapped features obey the subdistributions with corresponding pseudo labels in the prior distribution, and the preset optimization algorithm comprises one of an adaptive moment estimation (Adam), a stochastic gradient descent (SGD), and a root mean square prop (RMSProp) algorithm.

6. The unsupervised fault diagnosis method for mechanical equipment based on an adversarial flow model according to claim 1, wherein in step (5), actual health state of data with pseudo label is determined according to a correspondence relationship which is established by a few vibration signals with status class labels and pseudo labels of the vibration signals predicted by the model, thereby implementing the fault diagnosis of the mechanical equipment.

7. A computer device, comprising: a memory, a processor, and a computer program stored in the memory and configured to be executed by the processor, wherein the processor is configured to execute the program to implement the steps in the method according to claim 1.

8. A computer-readable storage medium, on which a computer program is stored, wherein a processor is configured to execute the program to implement the steps in the method according to claim 1.

9. A processor, configured to execute a program, wherein the program is executed to implement the method according to claim 1.

* * * * *